United States Patent
Donderici et al.

(10) Patent No.: US 10,465,496 B2
(45) Date of Patent: Nov. 5, 2019

(54) SLEEVE EXCITATION FOR RANGING MEASUREMENTS USING ELECTRODE SOURCES

(71) Applicant: Halliburton Energy Services, Inc., Houston, TX (US)

(72) Inventors: Burkay Donderici, Houston, TX (US); Baris Guner, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 15/534,378

(22) PCT Filed: Sep. 26, 2016

(86) PCT No.: PCT/US2016/053769
§ 371 (c)(1),
(2) Date: Jun. 8, 2017

(87) PCT Pub. No.: WO2018/057037
PCT Pub. Date: Mar. 29, 2018

(65) Prior Publication Data
US 2018/0230794 A1    Aug. 16, 2018

(51) Int. Cl.
*G01V 3/26* (2006.01)
*E21B 47/022* (2012.01)
(Continued)

(52) U.S. Cl.
CPC ........ *E21B 47/02216* (2013.01); *E21B 47/09* (2013.01); *E21B 47/122* (2013.01);
(Continued)

(58) Field of Classification Search
CPC ...... G01V 3/26; G01V 3/30; E21B 47/02216; E21B 47/09
See application file for complete search history.

(56) References Cited

U.S. PATENT DOCUMENTS 2,389,241 A * 11/1945 Silverman ................ G01V 3/24
324/347
2,658,725 A * 11/1953 Arps ........................ E21B 47/12
173/21
(Continued)

FOREIGN PATENT DOCUMENTS

CN        2727139 Y  *  9/2005
WO     2015/084379 A1    6/2015

OTHER PUBLICATIONS

International Search Report and Written Opinion issued in related PCT Application No. PCT/US2016/053769 dated May 10, 2017, 16 pages.
(Continued)

*Primary Examiner* — Walter L Lindsay, Jr.
*Assistant Examiner* — Milton Gonzalez
(74) *Attorney, Agent, or Firm* — Jason Sedano; Baker Botts L.L.P.

(57) ABSTRACT

The structural integrity and reliability of a downhole tool or mandrel may be improved by implementation of a design and configuration that does not require several separate components to be coupled together. An insulating sleeve is wrapped around the outside of a mandrel. Electrodes, both transmit and return, are wrapped around the insulating sleeve. The outside diameter of the mandrel is increased but the structural integrity and reliability of the mandrel is maintained as no gap sub is used to electrically isolate the electrodes from the mandrel. The insulating sleeve may be tapered at the edges to prevent excessive wear on the sleeve. The insulating sleeve may also extend the full distance between the electrodes to provide even more insulation.

17 Claims, 7 Drawing Sheets

(51) Int. Cl.
    *E21B 47/12*     (2012.01)
    *G01V 1/00*     (2006.01)
    *G01V 3/20*     (2006.01)
    *E21B 47/09*     (2012.01)

(52) U.S. Cl.
    CPC ............... *G01V 1/00* (2013.01); *G01V 3/20* (2013.01); *G01V 3/26* (2013.01)

(56) References Cited

U.S. PATENT DOCUMENTS

| | | | | |
|---|---|---|---|---|
| 2,659,046 | A | * | 11/1953 | Arps ........................ G01V 5/08 |
| | | | | 175/217 |
| 4,786,874 | A | | 11/1988 | Grosso et al. |
| 4,858,688 | A | * | 8/1989 | Edwards ............... E21B 17/105 |
| | | | | 166/241.4 |
| 5,084,678 | A | | 1/1992 | Hutin |
| 2009/0178850 | A1 | | 7/2009 | Waters et al. |
| 2015/0268371 | A1 | | 9/2015 | Donderici et al. |

OTHER PUBLICATIONS

Kuckes, Arthur F., et al. "An electromagnetic survey method for directionally drilling a relief well into a blown out oil or gas well." Society of Petroleum Engineers Journal 24.03 (1984): 269-274.

\* cited by examiner

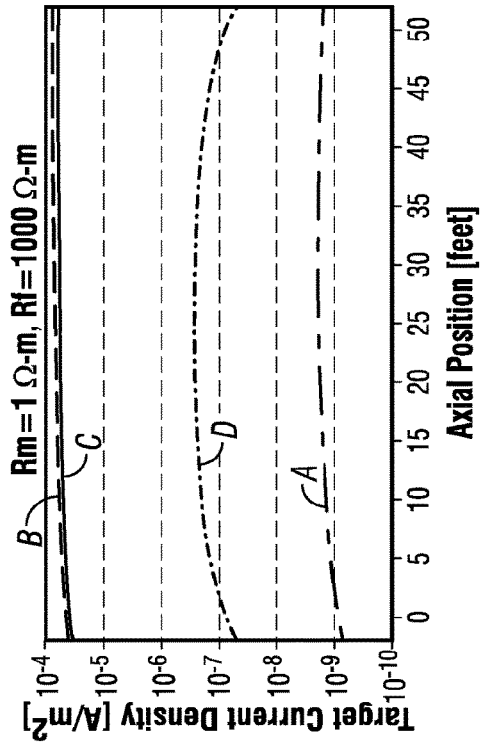
FIG. 6A
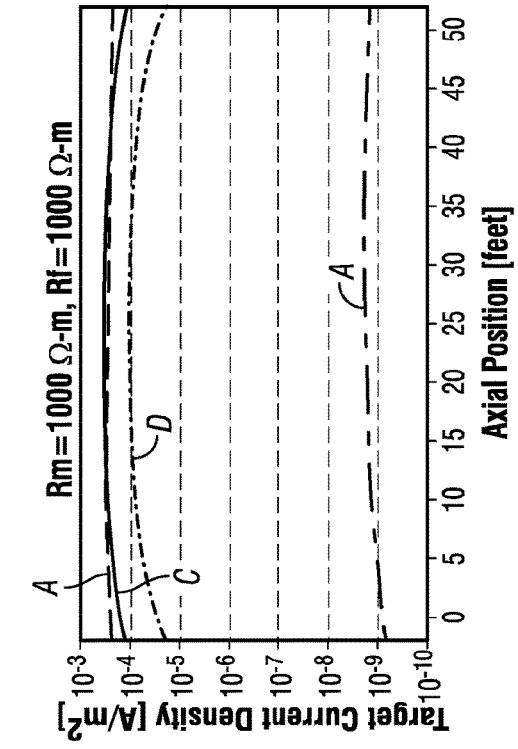
FIG. 6B
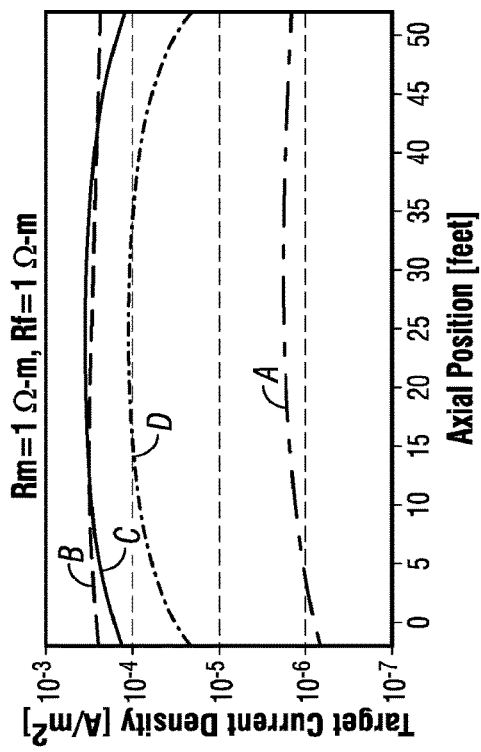
FIG. 6C
FIG. 6D

SLEEVE EXCITATION FOR RANGING MEASUREMENTS USING ELECTRODE SOURCES

CROSS-REFERENCE TO RELATED APPLICATION

The present application is a U.S. National Stage Application of International Application No. PCT/US2016/053769 filed Sep. 26, 2016, which is incorporated herein by reference in its entirety for all purposes.

BACKGROUND

The present disclosure relates generally to well drilling operations and, more particularly, to sleeve excitation for ranging measurements using electrode sources.

Hydrocarbons, such as oil and gas, are commonly obtained from subterranean formations that may be located onshore or offshore. The development of subterranean operations and the processes involved in removing hydrocarbons from a subterranean formation are complex. Typically, subterranean operations involve a number of different steps such as, for example, drilling a wellbore at a desired well site, treating the wellbore to optimize production of hydrocarbons, and performing the necessary steps to produce and process the hydrocarbons from the subterranean formation.

Ranging tools are used to determine the position, direction and orientation of a conductive pipe (for example, a metallic casing) for a variety of applications. In certain instances, such as in a blowout, it may be necessary to intersect a first well, called a target well, with a second well, called a relief well. The second well may be drilled for the purpose of intersecting the target well, for example, to relieve pressure from a blowout well. In certain instances, such as a crowded oil field, it may be necessary to identify the location of multiple wells to avoid collision incidents. In certain instances, a ranging tool is used to drill a parallel well to an existing well, for example, in steam assist gravity drainage (SAGD) well structures. In certain instances, a ranging tool is used to track an underground drilling path using a current injected metallic pipe over the ground as a reference. Traditional electrode sources, for example, for a mandrel, require insulating gap subs in ranging tool designs to prevent the source and return electrodes from effectively being shorted. It can be difficult to maintain structural integrity and reliability of the ranging tool due to these insulating gap subs.

FIGURES

Some specific exemplary embodiments of the disclosure may be understood by referring, in part, to the following description and the accompanying drawings.

Figure 4A:
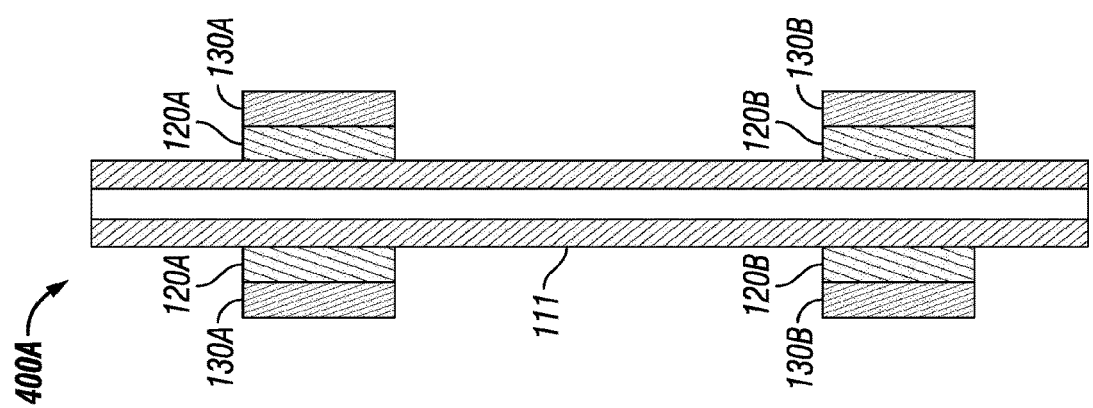
Figure 4B:
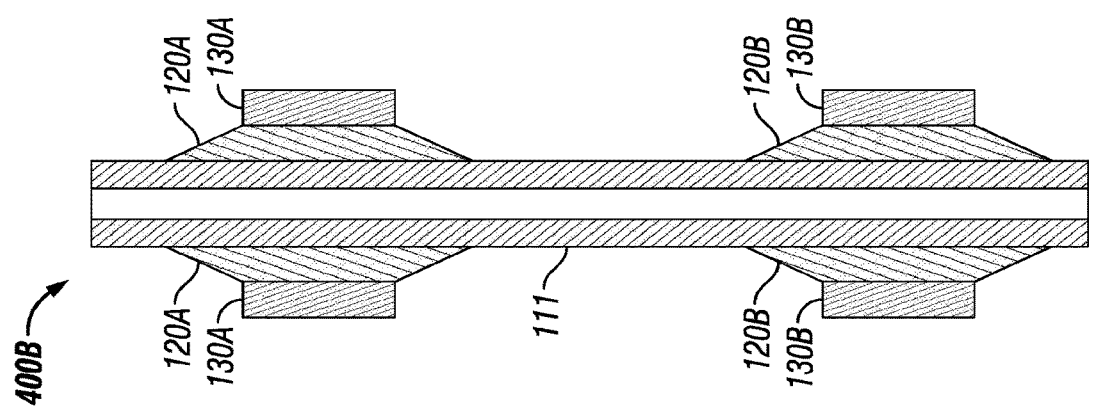
Figure 4C:
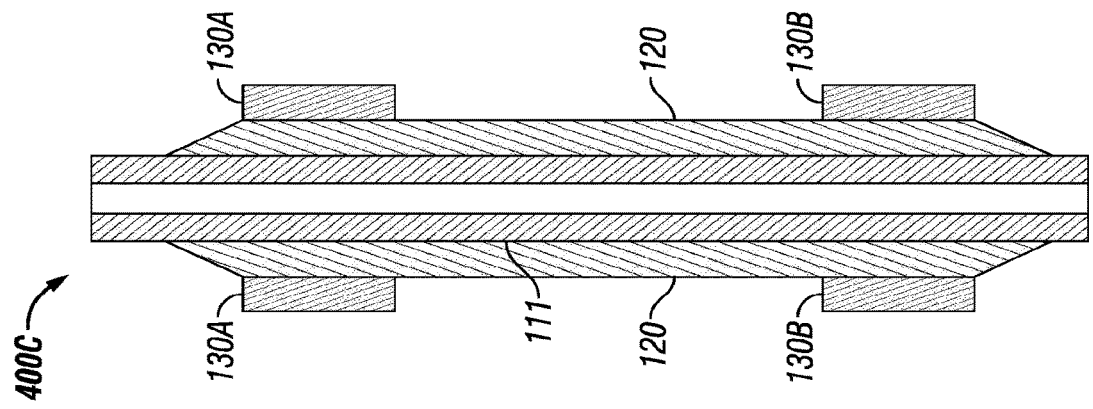
Figure 5A:
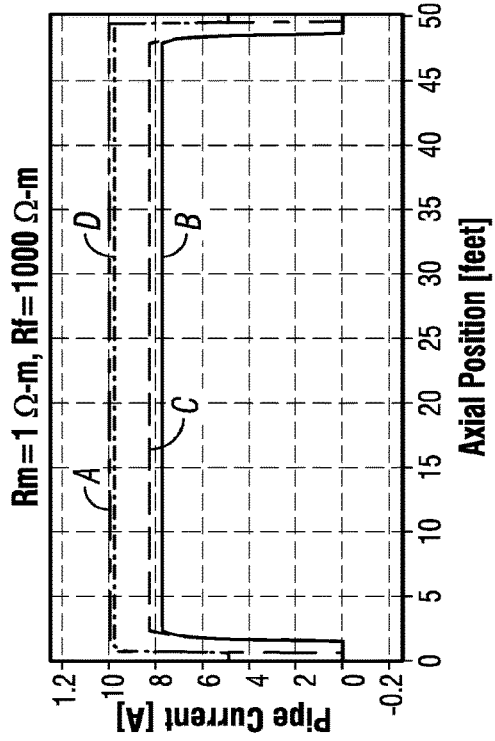
Figure 5B:
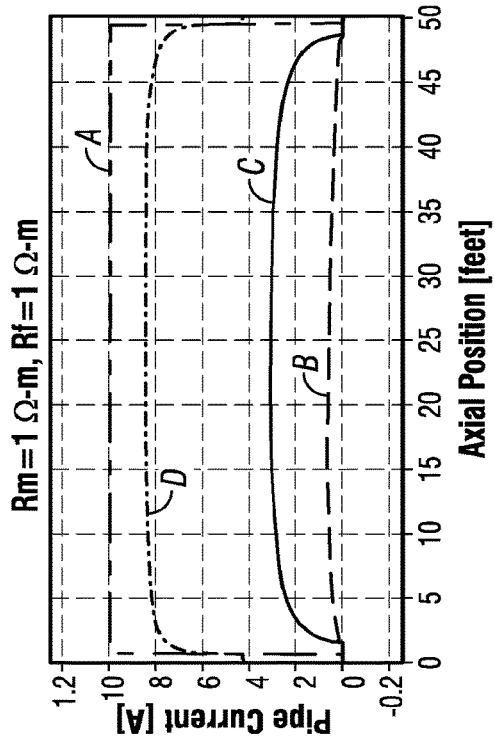
Figure 5C:
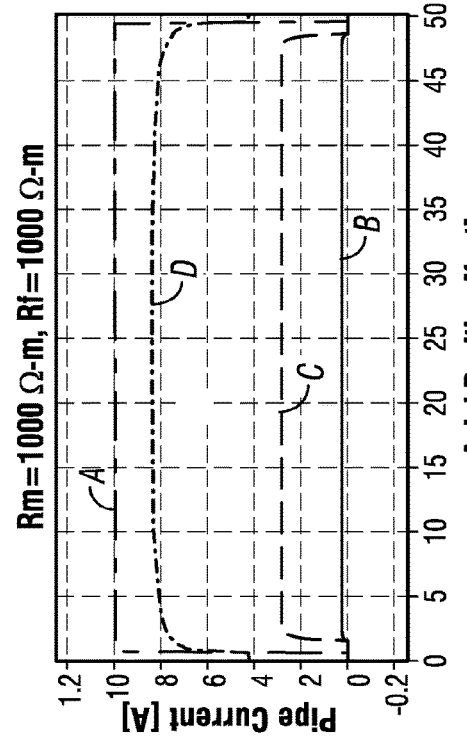
Figure 5D:
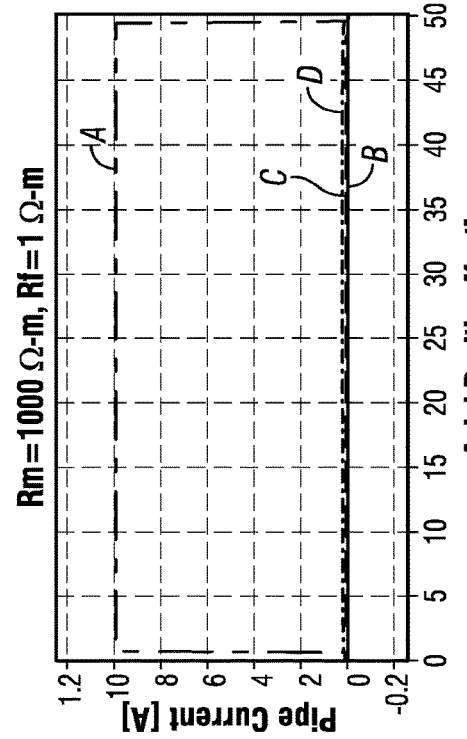

FIGS. 4A, 4B, and 4C are diagrams illustrating a cross-sectional view of an example ranging system, according to aspects of the present disclosure.

FIGS. 5A, 5B, 5C and 5D are graphs illustrating comparisons of the current induced on the mandrel according to aspects of the present disclosure.

FIGS. 6A, 6B, 6C and 6D are graphs illustrating comparisons of the current density in an axial direction according to aspects of the present disclosure.

Figure 7:
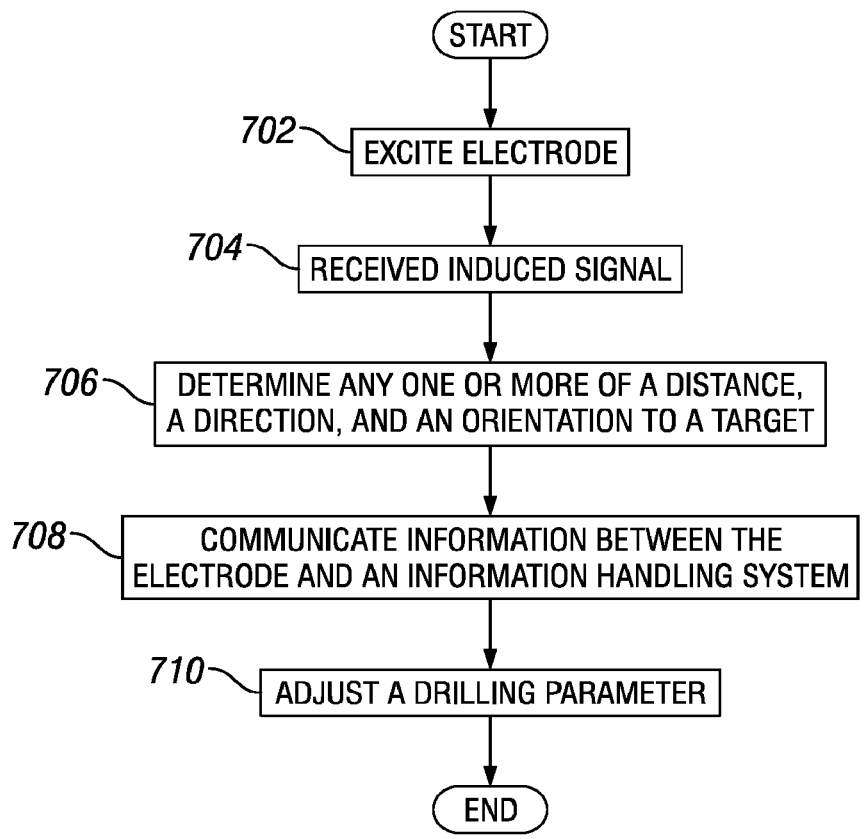

FIG. 7 is a flowchart illustrating a downhole ranging system according to aspects of the present disclosure.

While embodiments of this disclosure have been depicted and described and are defined by reference to exemplary embodiments of the disclosure, such references do not imply a limitation on the disclosure, and no such limitation is to be inferred. The subject matter disclosed is capable of considerable modification, alteration, and equivalents in form and function, as will occur to those skilled in the pertinent art and having the benefit of this disclosure. The depicted and described embodiments of this disclosure are examples only, and not exhaustive of the scope of the disclosure.

DETAILED DESCRIPTION

The present disclosure relates generally to well drilling operations and, more particularly, to sleeve excitation for ranging measurements using electrode sources.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communication with external devices as well as various input and output (I/O) devices, such as a keyboard, a mouse, and a video display. The information handling system may also include one or more buses operable to transmit communications between the various hardware components. The information handling system may also include one or more interface units capable of transmitting one or more signals to a controller, actuator, or like device.

For the purposes of this disclosure, computer-readable media may include any instrumentality or aggregation of instrumentalities that may retain data and/or instructions for a period of time. Computer-readable media may include, for example, without limitation, storage media such as a direct access storage device (for example, a hard disk drive or floppy disk drive), a sequential access storage device (for example, a tape disk drive), compact disk, CD-ROM, DVD, RAM, ROM, electrically erasable programmable read-only memory (EEPROM), and/or flash memory; as well as communications media such wires, optical fibers, microwaves, radio waves, and other electromagnetic and/or optical carriers; and/or any combination of the foregoing.

Illustrative embodiments of the present disclosure are described in detail herein. In the interest of clarity, not all features of an actual implementation may be described in this specification. It will of course be appreciated that in the development of any such actual embodiment, numerous implementation-specific decisions must be made to achieve the specific implementation goals, which will vary from one implementation to another. Moreover, it will be appreciated that such a development effort might be complex and time-consuming, but would nevertheless be a routine undertaking for those of ordinary skill in the art having the benefit of the present disclosure.

Throughout this disclosure, a reference numeral followed by an alphabetical character refers to a specific instance of an element and the reference numeral alone refers to the element generically or collectively. Thus, as an example (not shown in the drawings), widget "1a" refers to an instance of a widget class, which may be referred to collectively as widgets "1" and any one of which may be referred to generically as a widget "1". In the figures and the description, like numerals are intended to represent like elements.

To facilitate a better understanding of the present disclosure, the following examples of certain embodiments are given. In no way should the following examples be read to limit, or define, the scope of the disclosure. Embodiments of the present disclosure may be applicable to drilling operations that include but are not limited to target (such as an adjacent well) following, target intersecting, target locating, well twinning such as in SAGD (steam assist gravity drainage) well structures, drilling relief wells for blowout wells, river crossings, construction tunneling, as well as horizontal, vertical, deviated, multilateral, u-tube connection, intersection, bypass (drill around a mid-depth stuck fish and back into the well below), or otherwise nonlinear wellbores in any type of subterranean formation. Embodiments may be applicable to injection wells, and production wells, including natural resource production wells such as hydrogen sulfide, hydrocarbons or geothermal wells; as well as borehole construction for river crossing tunneling and other such tunneling boreholes for near surface construction purposes or borehole u-tube pipelines used for the transportation of fluids such as hydrocarbons. Embodiments described below with respect to one implementation are not intended to be limiting.

The terms "couple" or "couples" as used herein are intended to mean either an indirect or a direct connection. Thus, if a first device couples to a second device, that connection may be through a direct connection or through an indirect mechanical or electrical connection via other devices and connections. Similarly, the term "communicatively coupled" as used herein is intended to mean either a direct or an indirect communication connection. Such connection may be a wired or wireless connection such as, for example, Ethernet or local area network (LAN). Such wired and wireless connections are well known to those of ordinary skill in the art and will therefore not be discussed in detail herein. Thus, if a first device communicatively couples to a second device, that connection may be through a direct connection, or through an indirect communication connection via other devices and connections.

Modern petroleum drilling and production operations demand information relating to parameters and conditions downhole. Several methods exist for downhole information collection, including logging while drilling ("LWD") and measurement-while drilling ("MWD"). In LWD, data is typically collected during the drilling process, thereby avoiding any need to remove the drilling assembly to insert a wireline logging tool. LWD consequently allows the driller to make accurate real-time modifications or corrections to optimize performance while minimizing down time. MWD is the term for measuring conditions downhole concerning the movement and location of the drilling assembly while the drilling continues. LWD concentrates more on formation parameter measurement. While distinctions between MWD and LWD may exist, the terms MWD and LWD often are used interchangeably. For the purposes of this disclosure, the term LWD will be used with the understanding that this term encompasses both the collection of formation parameters and the collection of information relating to the movement and position of the drilling assembly.

There exist different approaches for obtaining current on the target pipe to perform ranging operations and for taking ranging measurements. In one approach, an electrode type source is used to induce current on the target pipe. This current then induces a secondary magnetic field which can be measured by the receivers on the ranging tool. Based on the strength of the magnetic field, location of the target well may be determined, for example. Alternatively, gradient of the magnetic field radiated by the target pipe in addition to the magnetic field itself may also be measured. By using a relationship between the magnetic field and its gradient, a ranging measurement may be made.

In existing ranging tools that use electrode excitation, electrodes are located directly on the downhole tool or mandrel which may alter the integrity or strength of the downhole tool or mandrel. This is an important consideration given the amount of stress on the downhole tool during drilling operations, for example, logging while drilling operations. If the electrodes are located on an exterior surface of the downhole tool the source and return electrodes would effectively be shorted necessitating the use of insulating gap subs which may also affect electrical connections producing difficulties in design and reduced reliability of the ranging tool. One or more embodiments of the present disclosure locate electrodes around an insulating sleeve which is wrapped around the downhole tool. The insulating sleeve ensures that there is no direct coupling from the electrodes to the downhole tool which may significantly reduce the currents on the downhole tool. Thus, effective downhole tool isolation is accomplished, comparable to that of a gap sub, with the cost of slightly larger diameter downhole tool but with the benefit that the structural strength and integrity and reliability of the downhole tool are improved.

Figure 1:
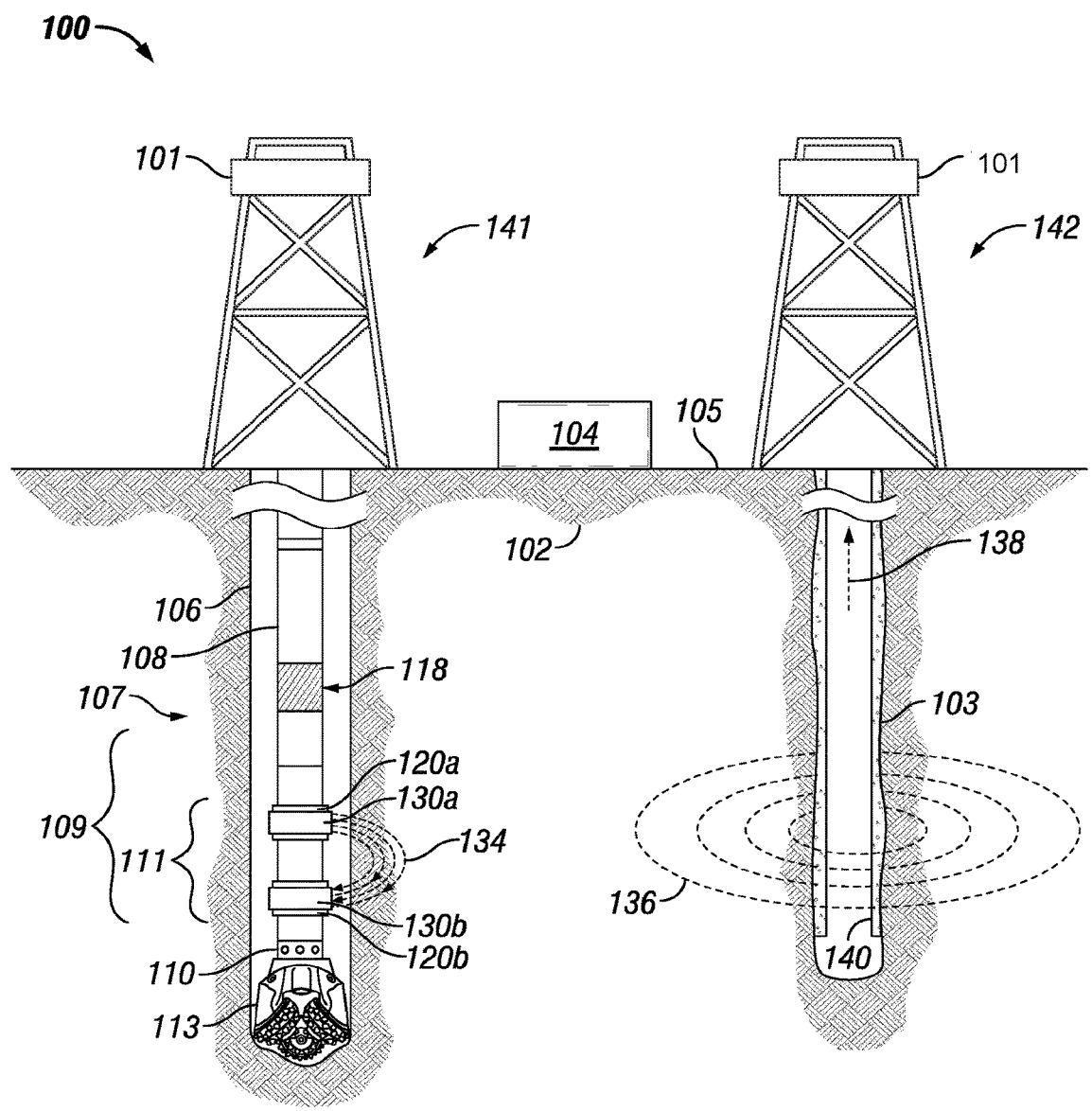
FIG. 1 is a diagram illustrating an example ranging system, according to aspects of the present disclosure.

FIG. 1 is a diagram illustrating an example drilling and ranging system environment 100, according to aspects of the present disclosure. The environment 100 includes rig 101 at the surface 105 and positioned above borehole 106 within a subterranean formation 102. Rig 101 may be coupled to a drilling assembly 107, comprising drill string 108 and bottom hole assembly (BHA) 109. The BHA 109 may comprise a drill bit 113 and a downhole tool 111. The downhole tool 111 may be any type of downhole tool 111 including, but not limited to, a MWD, an LWD, ranging tool, sensors, a galvanic tool, etc. In certain embodiments, the drilling assembly 107 may be rotated by a top drive mechanism (not shown) to rotate the drill bit 113 and extend the borehole 106. In certain other embodiments, a downhole motor (not shown), such as a mud motor, may be included to rotate the drill bit 113 and extend the borehole 106 without rotating the drilling assembly 107. In other embodiments, such as in an offshore drilling operation, the surface 105 may be separated from the rig 101 by a volume of water.

As used herein, a galvanic tool may comprise any tool with electrodes, for example, electrodes 130, through which current is injected into a subterranean formation and a voltage response of the formation to the injected current is measured. As the bit extends the borehole 106 through the formation 102, the downhole tool 111 may collect resistivity measurements relating to borehole 106, the borehole 103 and the formation 102. In certain embodiments, the orientation and position of the downhole tool 111 may be tracked using, for example, an azimuthal orientation indicator, which may include magnetometers, inclinometers, and/or accelerometers, though other sensor types such as gyroscopes may be used in some embodiments.

Ranging operations may require that a location of a target object, for example, a conductive target, be identified. In the embodiment shown, the target object comprises a target well 142 for a second borehole 103 associated with a rig 102. The borehole 103 may comprise a casing 140 containing or composed of an electrically conductive member such as casing, liner or a drill string or any portion thereof that has had a blowout or that needs to be intersected, followed, tracked or avoided. In the embodiment shown, the borehole 103 includes an electrically conductive casing 140. Identifying the location of the target well 142, with respect to the drilling well 141, with conductive casing 140 may comprise taking various measurements and determining a direction of the target well 142 and borehole 103 relative to the borehole 106. These measurements may comprise measurements of electromagnetic fields in the formation. Magnetic field measurements may identify the distance, orientation and direction to the target well 142.

In certain embodiments, performing ranging measurements may include inducing an electromagnetic (EM) field within the second borehole 103. In the embodiment shown, inducing a magnetic field within the borehole 106 comprises injecting a formation current 134 into the formation 102 by exciting a transmit electrode 130a and returning at return electrode 130b where the electrodes 130 are coupled to, attached to, or located at the sleeve 120. Part of the induced formation current 134 may be received and concentrated at the casing 140 within the target well 142, shown as current 138, and the current 138 on the casing 140 may induce a magnetic field 136 in an azimuthal direction from the direction of the flow of the electric current 138. Formation current 134 may be induced within the formation 102 by energizing the transmit electrode 130a of the drilling assembly 107 according to a control signal that specifies signal characteristics for the formation current 134. The formation current 134 may comprise, for example, an alternating current electrical signal. The transmit electrode 130a may be a solenoid electrode or any other type of suitable electrode. Part of the induced formation current 134 may be received and concentrated at the casing 140 within the target well 142, shown as current 138, and the current 138 on the casing 140 may induce a magnetic field 136 in an azimuthal direction from the direction of the flow of the electric current 138. A magnetic field 136 created by the target object or target well 142 may be proportional to the current flowing into the formation.

In particular, the drilling assembly 107 includes a sleeve 120 that may allow for a dipole electric field to be created to aid in flowing or drawing current into the formation 102. The sleeve 120, such as an insulating sleeve, may wrap around portions of the downhole tool 111. In any embodiment, the sleeve 120 may wrap around a top portion of the downhole tool 111 and/or a bottom portion of the downhole tool 111. In other embodiments, the sleeve 120 may wrap around any downhole tool, mandrel, LWD, MWD, BHA 109, or any other component or element of drill string 108. Electrodes 130 may be located on or attached to sleeve 120. Electrodes 130 may be positioned at various locations along a sleeve 120. Electrodes 130 may comprise a transmit electrode 130a located at a sleeve 120a and a receive electrode 130b located at a sleeve 120b. The sleeve 120 electrically isolates the electrodes 130 from downhole tool 111.

The transmit electrode 130a may comprise an antenna and the formation current 134 may comprise a time-varying magnetic field that is emitted from the transmit electrode 130a. The receivers 110 may comprise but are not limited to an induction type sensor, a Hall Effect magnetometer sensor, a magnetic gradiometer or a combination or pair of any of the magnetometers listed above or any other type of sensor or combination of sensors known to one of ordinary skill in the art. The receivers 110 may be sensors and may be uniaxial, biaxial, or triaxial, and also may be a flux-gate, solenoid, or coil type sensor. In certain embodiments, a sleeve 120 and corresponding attached electrode 130 may be positioned at various locations along the BHA 109, or above the BHA 109, such as between the drill string 108 and the BHA 109. The orientation of the electrodes 130 may be reversed, for example, the transmit electrode 130a may be located closer to the drill bit 113 or closer to the surface 105 in relation to the return electrode 130b. It may be advantageous to position the electrodes 130 as close to the bottom of the borehole 106 as possible. It may be advantageous to locate the transmit electrode 130a and return electrode 130b as far apart as possible or to locate the transmit electrode 130a and return electrode 130b within a predefined range.

A hole in the sleeve 120a and the downhole tool 111 or any other part of the BHA 109 or drilling assembly 107 may be utilized to permit a wire (not shown) to couple to the transmit electrode 130a to excite (for example, direct the formation current 134) the transmit electrode 130a. In any embodiment, the transmit electrode 130a may be located on the order of 10-200 feet (or at or about 3.048-60.96 meters) from the return electrode 130b or at any range greater, lesser or in between.

In certain embodiments, performing ranging measurements may include inducing an electromagnetic (EM) field within the second borehole 103 based, at least in part, on a formation current 134 injected into the formation 102. In the embodiment shown, inducing a magnetic field within the borehole 103 comprises injecting a formation current 134 by exciting a transmit electrode 130a to induce current to flow into the formation and return at return electrode 130b. The source of the excitation may be a voltage or a current. Electrodes 130 may be components of the downhole tool 111, BHA 109, or any other downhole component. Formation current 134 may be induced within the formation 102 by energizing the transmit electrode 130a of the drilling assembly 107 according to a control signal that specifies signal characteristics for the formation current 134. The formation current 134 may comprise, for example, an alternating current electrical signal. Part of the formation current 134 may be received and concentrated at the casing 140 within the conductive target (for example, target well 142), shown as current 138, and this current 138 on the casing 140 may induce a magnetic field 136 in an azimuthal direction from the direction of the flow of the electric current 138. A magnetic field 136 created by the conductive target or casing 140 may be proportional to the current flowing into the formation 102.

In certain embodiments, a system control unit 104 may he positioned at the surface 105 as depicted in FIG. 1 and may be communicably or communicatively coupled to downhole elements including, but not limited to, drilling assembly 107, telemetry system 118, downhole tool 111, and BHA 109. In other embodiments, a system control unit 104 may be positioned below the surface 105 (not shown) and may communicate data to another system control unit 104 or any other system capable of receiving data from the system control unit 104. For example, the control unit 104 may be communicably coupled to the downhole tool 111, electrodes 130, drill bit 113, or any other component through a telemetry system 118. The telemetry system 118 may be incorporated into the BHA 109 or any other downhole component of drilling assembly 107 and may comprise a mud pulse type telemetry system that transmits information between the surface system control unit 104 and downhole elements via pressure pulses in drilling mud. Although the system control unit 104 is positioned at the surface 105 in FIG. 1, certain processing, memory, and control elements may be positioned within the drilling assembly 107. Additionally, various other communication schemes may be used to transmit communications to/from the system control unit 104, including wireline configurations and wireless configurations.

In certain embodiments, the system control unit 104 may comprise an information handling system with at least a processor and a memory device coupled to the processor that contains a set of instructions that when executed cause the processor to perform certain actions. In any embodiment, the information handling system may include a non-transitory computer readable medium that stores one or more instructions where the one or more instructions when executed cause the processor to perform certain actions. As used herein, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a computer terminal, a network storage device, or any other suitable device and may vary in size, shape, performance, functionality, and price. The information handling system may include random access memory (RAM), one or more processing resources such as a central processing unit (CPU) or hardware or software control logic, read only memory (ROM), and/or other types of nonvolatile memory. Additional components of the information handling system may include one or more disk drives, one or more network ports for communication with external devices as well as various input and output (I/O) devices, such as a keyboard, a mouse, and a video display. The information handling system may also include one or more buses operable to transmit communications between the various hardware components.

The formation current 134 may be injected into the formation 102 by excitation of the transmit electrode 130*a*. In certain embodiments, the system control unit 104 may excite the transmit electrode 130*a* by sending a command downhole to the downhole tool 111 or a controller associated with the downhole tool 111. The command(s) may cause the downhole tool 111 to excite the transmit electrode 130*a*. In other embodiments, the transmit electrode 130*a* is excited by a downhole source located at or associated with the downhole tool 111. In one or more embodiments the source of excitation may be located downhole or at the surface 105.

In certain embodiments, the signal characteristics of the formation current 134 may be based at least in part on at least one downhole characteristics within the borehole 106 and formation 102, including a noise level within the formation 102; a frequency transfer function of the transmit electrode 130*a*, the return electrode 130*b*, and the formation 102; and a frequency response of the target object. The noise level within the formation 102 may be measured downhole using electromagnetic or acoustic receivers coupled to the drilling assembly, for example. The frequency transfer function and the frequency response of the target borehole 103 may be determined based on various mathematical models, or may he extrapolated from previous ranging measurements. In certain embodiments, the system control unit 104 may further send commands to the receivers 110 to cause one or more of the receivers 110 to measure the induced magnetic field 136 on the second borehole 103. Like the transmit electrode 130*a*, the receivers 110 may be coupled to a downhole controller, and the commands from the system control unit 104 may control, for example, when the measurements are taken. In certain embodiments, the system control unit 104 may determine and set a sampling rate of the induced magnetic field 136, as will be described below. Additionally, measurements taken by the receivers 110 may be transmitted to the system control unit 104 via the telemetry system 118. The control unit 104 may determine a distance, orientation and direction to the conductive target (for example, target well 142 or casing 140 of borehole 103) in the embodiment shown, based at least in part on the measurement of the induced magnetic field 136. For example, the system control unit 104 may use geometric algorithms to determine the distance, orientation and direction of the second borehole 103 relative to the borehole 106. While receivers 110 arc shown near the drill bit 113, in one or more embodiments the receivers 110 may be located at any location along the downhole tool 111.

Figure 2:
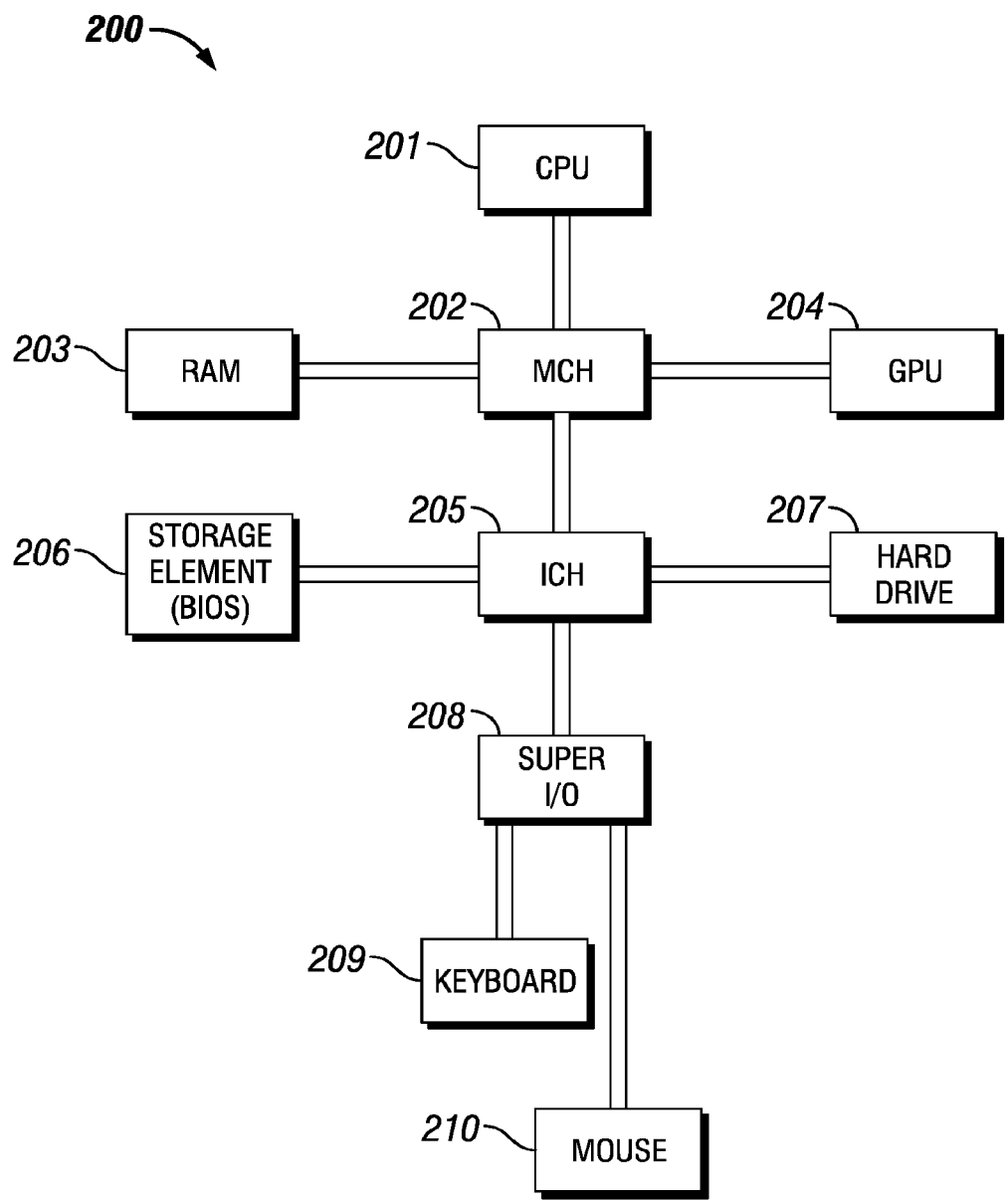
FIG. 2 is a diagram illustrating an example information handling system, according to aspects of the present disclosure.

FIG. 2 is a diagram illustrating an example information handling system 200, according to aspects of the present disclosure. The system control unit 104 may take a form similar to the information handling system 200. A processor or central processing unit (CPU) 201 of the information handling system 200 is communicatively coupled to a memory controller hub or north bridge 202. The processor 201 may include, for example a microprocessor, microcontroller, digital signal processor (DSP), application specific integrated circuit (ASIC), or any other digital or analog circuitry configured to interpret and/or execute program instructions and/or process data. Processor 201 may be configured to interpret and/or execute program instructions or other data retrieved and stored in any memory such as memory 203 or hard drive 207. Program instructions or other data may constitute portions of a software or application for carrying out one or more methods described herein. Memory 203 may include read-only memory (ROM), random access memory (RAM), solid state memory, or disk-based memory. Each memory module may include any system, device or apparatus configured to retain program instructions and/or data for a period of time (for example, computer-readable non-transitory media). For example, instructions from a software or application may be retrieved and stored in memory 203 for execution by processor 201.

Modifications, additions, or omissions may be made to FIG. 2 without departing from the scope of the present disclosure. For example, FIG. 2 shows a particular configuration of components of information handling system 200. However, any suitable configurations of components may be used. For example, components of information handling system 200 may be implemented either as physical or logical components. Furthermore, in some embodiments, functionality associated with components of information handling system 200 may be implemented in special purpose circuits or components. In other embodiments, functionality associated with components of information handling system 200 may be implemented in configurable general purpose circuit or components. For example, components of information handling system 200 may be implemented by configured computer program instructions.

Memory controller hub 202 may include a memory controller for directing information to or from various system memory components within the information handling system 200, such as memory 203, storage element 206, and hard drive 207. The memory controller huh 202 may be coupled to memory 203 and a graphics processing unit 204. Memory controller hub 202 may also be coupled to an I/O controller hub or south bridge 205. I/O hub 205 is coupled to storage elements of the information handling system 200, including a storage element 206, which may comprise a flash ROM that includes a basic input/output system (BIOS) of the computer system. I/O hub 205 is also coupled to the hard drive 207 of the information handling system 200. I/O hub 205 may also be coupled to a Super I/O chip 208, which is itself coupled to several of the I/O ports of the computer system, including keyboard 209 and mouse 210.

In certain embodiments, determining the distance and direction of the second borehole 103 relative to the first borehole 106 may be accomplished using the magnetic fields received by the receivers 110. In certain embodiments, the distance and direction determination may be achieved utilizing the relationship in Equation (1) between the pipe current and the received magnetic fields.

$$\overline{H} = \frac{I}{2\pi r}\hat{\phi} \quad \text{Equation (1)}$$

where H is the magnetic field vector, I is the current on the pipe 140, r is the shortest distance between the return electrode 130b and the casing 140; and φ is a unit vector in the azimuthal direction with respect to a cylindrical coordinate system whose axis lie along the target, for example a target well 142. Although Equation (1) assumes constant casing current along the casing, and casing is straight, it can be extended to any current distribution by using the appropriate model.

In certain embodiments, the distance and direction of the second borehole 103 relative to the first borehole 106 may be determined using Equations (2) and (3), respectively.

$$r = \frac{I}{2\pi |\overline{H}|} \quad \text{Equation (2)}$$

$$\Phi = \text{angle}(\hat{x} \cdot \overline{H}, \hat{y} \cdot \overline{H}) + 90 \quad \text{Equation (3)}$$

where "·" is the vector inner-product operation. In certain instances, however, Equation (2) may be unreliable if a direct or accurate measurement of I is not possible.

When a direct or accurate measurement of I is difficult or impossible, magnetic field gradient measurement may be utilized for the direction and distance determinations. Spatial change in the magnetic field may be measured in a direction that has a substantial component in the radial (r-axis) direction as in Equation (4).

$$\frac{\partial \overline{H}}{\partial r} = -\frac{I}{2\pi r^2}\hat{\phi} \quad \text{Equation (4)}$$

where ∂ is the partial derivative. With this gradient measurement available in addition to an absolute measurement, the distance to the second borehole 103 may be calculated using Equation (5).

$$r = \frac{|\overline{H}|}{\left|\frac{\partial \overline{H}}{\partial r}\right|} \quad \text{Equation (5)}$$

Figure 3:
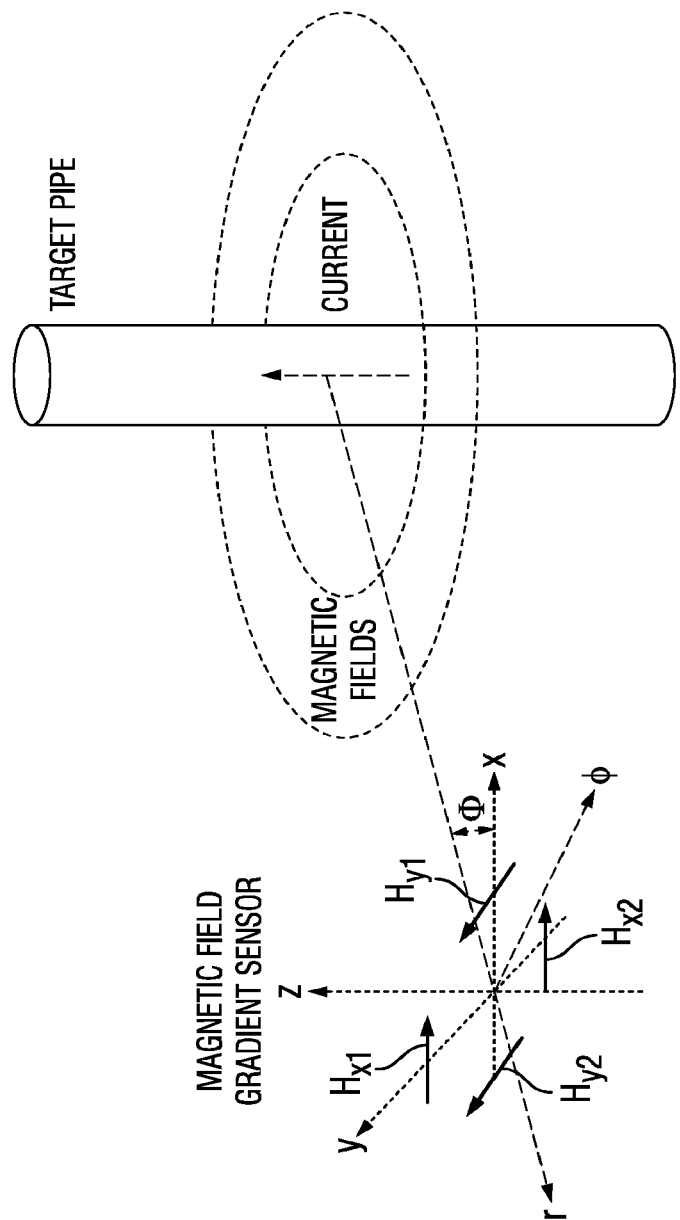
FIG. 3 is a diagram illustrating example gradient measurement components in relation to a target pipe and the magnetic fields produced by currents on the pipe.

In certain embodiments, the gradient field in Equation (5) may be realized in practice by utilizing finite difference of two magnetic field dipole measurements as shown below in Equation (6):

$$r = \frac{H_y}{\frac{H_y\left(x+\frac{\Delta x}{2}, y\right) - H_y\left(x-\frac{\Delta x}{2}, y\right)}{\Delta x}} \quad \text{Equation (6)}$$

where $H_y$ and the gradient measurement components are illustrated in the 4-dipole configuration of FIG. 3 in relation to a target casing 140 and the magnetic fields produced by currents on the casing 140.

FIG. 4A, FIG. 4B and FIG. 4C are diagrams illustrating an example electrode excitation system 400A, 400B and 400C, respectively, according to one or more embodiments of the present disclosure. Although slight variations may exist between different ranging tools that utilize electrode excitation, generally such operate in a similar manner. An electrode 130 is excited with a current or voltage source which causes the current to be emitted from a source electrode (for example, transmit electrode 130a) into the formation 102 through the mud. In general, and especially for LWD tools, the drill string 108 or the mandrel of the downhole tool 111 (or ranging tool) is preferred to be metallic. A metallic downhole tool 111 increases the structural strength of the drill string 108, enables it to better resist the considerable stress caused by the weight of the drill string 108 and its torque and reduces mechanical failures. However, a metallic structure is electrically highly conductive. Since electrical current prefers to flow in the path of least resistance, the metallic structure itself as opposed to the formation 102 provides a more attractive path to a return electrode 130b. Thus, current emitted into the formation 102 is reduced by the amount of current that is emitted through the metallic structure. To prevent current from flowing through the metallic structure and to force current into the formation 102, insulating gap subs may be inserted in downhole tool 111. Although these gap subs prevent current flow along the metallic structure (for example, along BHA 109 or downhole tool 111), current may short to downhole tool 111 through the mud around the gap sub. Though some current is lost, a significant portion of the current may flow to the formation 102 compared to a configuration without the gap sub.

However, to insert a gap sub, it is necessary to physically separate the downhole tool 111 into multiple pieces and add an insulating material between these separated pieces. The resulting ranging tool or system has a weaker structural strength than a single piece tool without gap subs and may be more prone to mechanical failures. Also, in general, a variety of cables (for example, cables for telemetry and power transfer) run inside the tool and must pass through each gap sub. Accommodating the passage of these cables through each gap sub may present a design challenge as these cables must be fitted inside the gap sub. A higher incidence of failures of the tool or system may arise due to failure of the cables or interconnects that are on or around the gap subs. Difficulties may also be experienced, for example, in the production of a feasible deep ranging tool due to reduced performance or reliability issues.

A ranging tool according to the present disclosure that includes an electrode excitation system 400A, 400B and 400C as illustrated in FIG. 4A, FIG. 4B and FIG. 4C, respectively, is well adapted to attain the ends and advantages of a more reliable, more structurally stable and easier to manufacture ranging tool or downhole tool 111 and system as well as those that are inherent therein. FIG. 4A, FIG. 4B and FIG. 4C each include electrodes 130, sleeves 120 and downhole tool 111. Sleeve 120 is an insulating sleeve wrapped around the downhole tool 111 with the electrode 130 wrapped around the sleeve 120 with no direct physical contact to the downhole tool 111. For example, the electrodes 130 form a band around the sleeves 120. The electrodes 130 include a transmit electrode 130a and a return electrode 130b. In certain embodiments the number of transmit electrodes 130a and the number of return electrodes 130b are not the same. Sleeve 120 provides effective isolation, comparable to that of a gap sub, to prevent direct coupling from electrodes 130 to the downhole tool 111. As a result, the amount of current flowing through the mandrel or downhole tool 111 is reduced while the amount of current reaching the target object is increased. The designs illustrated in FIG. 4A, FIG. 4B and FIG. 4C may improve the structural strength or integrity and reliability of an electrode excitation system 400 by eliminating the need for gap subs while only increasing costs marginally due to the increased diameter of the downhole tool 111.

The sleeve 120 may have insulating properties that prevent electrical or direct physical contact between the downhole tool 111 and the electrodes 130. The insulation provided by the sleeve 120 prevents current from flowing through downhole tool 111 when the transmit electrode 130a is excited resulting in more current flowing into the formation 102. The sleeve 120 may be of any thickness as required by the specific criteria for a given environment 100 or a given downhole tool 111. Each sleeve 120 and electrode 130 may include an opening (for example, a hole or aperture) (not shown) to permit any cables to be fed from the downhole tool 111 through the sleeve 120 to the electrode 130. For example, a source cable may be fed to the transmit electrode 130a from the downhole tool 111 through the sleeve 120 via the opening so as to excite the transmit electrode 130a. The opening may be only as big as necessary to allow for the cabling. While one of ordinary skill in the art will recognize that the smaller the opening the greater the structural integrity of the downhole tool 111, the present disclosure contemplates any size opening as necessary for any embodiment. The electrodes 130 may be slid on the sleeves 120, mounted to the downhole tool 111 through mounting holes (not shown) of the sleeves 120, shrink-wrapped onto the sleeves 120, affixed in any manner known to one of ordinary skill in the art, or any combination thereof.

In certain embodiments, the sleeves 120 have the same thickness throughout the axial length of the sleeves 120. In one or more other embodiments, the sleeves 120 have a varying thickness throughout the axial length of the sleeves 120. In any embodiment, the sleeves 120 and electrodes 130 may be placed at any location along the downhole tool 111. In certain embodiments, the electrode 130a is located above the return electrode 130b while in other embodiments, the return electrode 130b is located above the transmit electrode 130a. While FIGS. 4A-4C depict electrodes 130 and sleeves 120 being the same size, in certain embodiments, electrodes 130 and sleeves 120 may vary such that transmit electrode 130a may have a different dimension than return electrode 130b. In certain embodiments, one or more electrodes 130 may be located at the surface 105. For example, one of the return electrodes 130b or the transmit electrode 130a may be located at the surface 105. In certain embodiments, a plurality of transmit electrodes 130a and a plurality of return electrodes 130b are located at any position along the downhole tool 111.

As shown in FIG. 4A, in certain embodiments electrodes 130 and sleeves 120 may each have the same axial length. While axial length for the electrodes 130 and sleeves 120 may be between two and thirty-two inches (or at or about between 5.08 centimeters and 81.28 centimeters), the present disclosure contemplates any axial length for the electrodes 130 and sleeves 120 as permitted by the design of the electrode excitation system 400. In certain embodiments, the electrodes 130 may have a shorter axial length than the sleeves 120.

As shown in FIG. 4B, in certain embodiments, sleeves 120 have a greater axial length than the electrodes 130 and are also tapered. The taper of sleeves 120 may be at an angle as shown in FIG. 4B or may be curved, rounded, sloped, chamfered, extended in any other manner known to one of ordinary skill in the art or any combination thereof. Extending the sleeve 120 beyond electrodes 130 may increase isolation and as such may result in more current being directed into the formation 102. The axial length extension of the sleeve 120 may provide better isolation of the electrodes 130 from the downhole tool 111 while the taper at the edges of sleeve 120 may minimize friction experienced by the sleeve 120 which may extend the life of the sleeve 120.

As shown in FIG. 4C, a sleeve 120 extends from the transmit electrode 130a to the return electrode 130b. Extending the axial length of the sleeve 120 as illustrated in FIG. 4C may provide improved isolation and maximize current transmitted to the formation 102. The sleeve 120 of FIG. 4C may experience faster degradation due to the expanded exposure of the sleeve 120.

FIGS. 5A-5D illustrate exemplary simulations for different configurations. For each configuration, the distance between the transmit electrode 130a and the return electrodes 130b of a given configuration is 50 feet (approximately 15.24 meters). Each electrode has a length of one foot (or approximately 30.48 centimeters). It is assumed that a one amp impressed current is supplied by a wire that runs from the return electrode to the transmit (or source) electrode, which in turn is transmitted and eventually returns to the return electrode by travelling through a mud, the mandrel (or downhole tool) and/or a formation 102. In configuration "A", electrodes are not separated by any gap sub and are located on the downhole tool 111. In configuration "B", electrodes are separated by two gap subs where one gap sub is located directly below a return electrode and one gap is located directly above a transmit electrode. In configuration "C", electrodes are separated by four gap subs with each electrode having a gap sub located directly above and below. Each gap sub in configuration "B" and "C" has a length of one foot (or approximately 30.48 centimeters) and may be assumed to be made of plastic. In configuration "D", the electrodes 130 are wrapped around an isolating sleeve 120 as illustrated in FIG. 4A. The isolating sleeves 120 are assumed to have a thickness of 0.5 inches (approximately 1.27 centimeters) and the electrodes 130 are assumed to have a thickness of 0.2 inches (approximately 0.508 centimeters). Both the sleeves 120 and the electrodes 130 are assumed to be located at the same axial location and to have the same axial length. The mandrel or downhole tool 111 for each configuration is assumed to have an outer diameter of 6.75 inches (approximately 17.145 centimeters) and an inner diameter of 5.75 inches (approximately 14.605 centimeters) and is assumed to be perfectly conducting. Each configuration is also assumed to have a borehole radius of 10 inches (approximately 25.4 centimeters) and a total length of the mandrel or downhole tool 111 of 100 meters. For each illustration in FIGS. 5A-5D, the mud resistivity is denoted as Rm and formation resistivity is denoted as Rf. Also, for each simulation, the transmit electrode is assumed to be the center of a cylindrical coordinate system, for example, z=0, while the return electrode is at z=+20 feet (approximately 6.096 meters) and the end of the downhole tool or mandrel was assumed to be at z=−10 meters.

In FIGS. 5A-5D, current on the mandrel produced by the configuration of FIG. 4A is compared to configurations "A", "B" and "C" as discussed above. FIGS. 5A-5D illustrate simulations using Rm=1 Ω-meter and Rf=1 Ω-meter, Rm=1 Ω-meter and Rf=1000 Ω-meter, Rm=1000 Ω-meter and Rf=1 Ω-meter, and Rm=1000 Ω-meter and Rf=10000 Ω-meter, respectively. The results of the simulations illustrated in FIGS. 5A-5D confirm expectations that for configuration "A" the two electrodes are effectively shorted together and almost all the current flows directly on the mandrel from the transmit electrode to the return electrode. Also, FIGS. 5A-5D confirm that the two gap sub configuration of "B" has a lower level of current than the four gap sub configuration of "C". The configuration of "D" (the configuration of FIG. 4A) reduces the amount of current flowing through the mandrel without the use of a gap sub, although not quite as effectively as configurations "B" and "C". It should be noted that performance of the configurations depends on the mud and the formation resistivity. For configuration "D", if the formation 102 is very conductive with respect to mud (Rm=1000 Ω-meter, Rf=1 Ω-meter), almost all of the total current flows through the formation 102. However, when Rm=1 Ω-meter and Rf=1000 Ω-meter, current exclusively flows through the mandrel. It can also be noted that current levels in the two homogeneous media, where Rm=1 Ω-meter, Rf=1 Ω-meter and Rm=1000 Ω-meter, Rf=1000 Ω-meter, are essentially the same. However, voltages needed to obtain the one amp current level for the high resistivity case would be ~1000 times higher.

Another performance simulation is illustrated for configurations "A", "B", "C" and "D" in FIGS. 6A-6D. FIGS. 6A-6D illustrate a comparison of levels of axially directed current density (Jz) at a radial distance of ten meters from the mandrel for the same Rm and Rf parameters as in FIGS. 5A-5D. Although the specifications of a target object were not included in the simulations, it will be recognized that if the current density is high, a higher amount of current would flow on a target object when the target object is present which results in making the ranging easier. The results of FIGS. 6A-6D illustrate that the configuration of "D" (the configuration of FIG. 4A) does not result in significant loss in target object signal in all cases except for where Rm=1 Ω-meter and Rf=1000 Ω-meter when compared to the configuration of "C". The configuration of "D" is more advantageous than the configuration of "B" for Rm=1000 Ω-meter and RF=1 Ω-meter. Overall the configuration of "D" shows great improvement compared to the configuration of "A".

FIG. 7 is a flowchart illustrating a downhole ranging system according to aspects of the present disclosure. At step 702, an electrode of a downhole tool 111, for example, electrode 130a, is excited. An insulating sleeve, for example, insulating sleeve 120a, isolates the electrode from the downhole tool 111. The electrode and the insulating sleeve circumnavigate the diameter of the downhole tool. In one or more embodiments a single sleeve circumnavigates the downhole tool 111 and extends axially so as to insulate a first electrode pair (a first transmit electrode 130a associated with a first return electrode 130b) and a second electrode pair (a second transmit electrode 130a associated with a second return electrode 130b) without any break in the sleeve. In one or more embodiments, the electrodes 130 insulated by individual insulating sleeves 120 or any number of electrodes 130 may be insulated by an insulating sleeve and any other number of other electrodes 130 may insulated by another insulating sleeve. The electrode may be placed anywhere along the downhole tool 111 and may be arranged according to any one or more of FIGS. 4A-4C. While typical downhole tools 111 are cylindrical in shape and therefore the electrodes 130 and the insulating sleeves 120 are cylindrical in shape, the present disclosure contemplates any suitable shape for the electrodes 130 and the insulating sleeves 120. The excitation of the electrode causes a formation current, for example, formation current 134, to be produced.

At step 704, one or more induced signals, for example, magnetic field 136, are received from a target (such as casing 140 of target well 142). When the first electrode is excited so as to produce a formation current 134 into the formation 102, an associated induced signal, for example, magnetic field 136, from the target may be received at one or more receivers 110.

At step 706, any one or more of a distance, a direction, and an orientation to the target (such as casing 140 of target 142) may be determined. This determination may be based, at least in part, on the received on or more induced signals at any of the one or more receivers 110. At step 708, information is communicated between the electrode and an information handling system (such as system control unit 104) at the surface 105. The information may comprise any downhole measurement or parameter including, but not limited to, any measurement received from receivers 110, any parameter determined such as direction, distance an orientation to a target, any other type of information, or any combination thereof. At step 710, a drilling parameter is adjusted based, at least in part, on at least one of the determined distance, direction and orientation. The method continues at step 702 if another electrode is required to be excited or the method may end.

In one or more embodiments, a determination at step 706 is not made until after two or more electrodes have been excited and the one or more induced signals associated with each of the two or more electrodes has been received. In one or more embodiments, the two or more electrodes are excited sequentially, at different intervals or at any other interval. In one or more embodiments, the same electrode is excited at different orientations of the downhole tool 111. The present disclosure contemplates that any of the steps of FIG. 7 may be implemented in suitable order or that any one or more steps may not be implemented.

In one or more embodiments a method for downhole ranging within a formation comprises exciting a first electrode that is electrically isolated from a downhole tool by a first insulating sleeve, wherein the first electrode and the first insulating sleeve circumnavigate a first portion of the downhole tool, and wherein exciting the first electrode produces a first formation current, receiving one or more induced signals from a target, wherein the one or more induced signals are associated with the first formation current, determining at least one of a distance, a direction and an orientation to the target based, at least in part, on the one or more induced signals and adjusting one or more drilling parameters based, at least in part, on at least one of the distance, the direction and the orientation. In one or more embodiments, the first electrode is shrink-wrapped onto the first insulating sleeve. In one or more embodiments, the first electrode is electrically coupled to one or more electrical components of the downhole tool via an opening that extends from inside the downhole tool through the first insulating sleeve. In one or more embodiments, the first insulating sleeve is tapered at each edge. In one or more embodiments, the method for downhole ranging within the formation further comprises communicating information between the first electrode and an information handling system at a surface. In one or more embodiments, the method for downhole ranging within the formation further comprises exciting a second electrode insulated from the downhole tool by a second insulating sleeve, wherein the second electrode circumnavigates a second portion of the downhole tool, and wherein exciting the second electrode causes the second electrode to act as a return for the first formation current. In one or more embodiments, the first insulating sleeve and the second insulating sleeve form a single sleeve that extends from the first portion through the second portion.

In one or more embodiments, a wellbore drilling system for drilling in a subsurface earth formation comprises a drill string, a first insulating sleeve coupled to the drill string, a first electrode coupled to the first insulating sleeve, wherein the first electrode circumnavigates the drill string, and wherein the first insulating sleeve electrically isolates the first electrode from the drill string and an information handling system communicably coupled to the drill string, the information handling system comprises a processor and memory device coupled to the processor, the memory device containing a set of instruction that, when executed by the processor, cause the processor to excite the first electrode that is electrically isolated from the drill string by the first insulating sleeve, wherein the first electrode circumnavigates a first portion of the drill string, and wherein exciting the first electrode produces a first formation current, receive one or more induced signals from a target, wherein the one or more induced signals are associated with the first formation current, determine at least one of a distance, a direction and an orientation to the target based, at least in part, on the one or more induced signals, adjust one or more drilling parameters based, at least in part, on at least one of the distance, the direction and the orientation. In one or more embodiments, the first electrode is shrink-wrapped onto the first insulating sleeve. In one or more embodiments, the first electrode is electrically coupled to one or more electrical components of the drill string via an opening that extends from inside the drill string through the first insulating sleeve. In one or more embodiments, the first insulating sleeve is tapered at each edge. In one or more embodiments, the set of instructions of the wellbore drilling system for drilling in the subsurface earth formation further cause the processor to communicate information between the first electrode and an information handling system at a surface. In one or more embodiments, the set of instructions of the wellbore drilling system for drilling in the subsurface earth formation further cause the processor to excite a second electrode insulated from the drill string by a second insulating sleeve, wherein the second electrode circumnavigates a second portion of the drill string, and wherein exciting the second electrode causes the second electrode to act as a return for the first formation current. In one or more embodiments, the first insulating sleeve and the second insulating sleeve form a single sleeve that extends from the first portion through the second portion.

In one or more embodiments a non-transitory computer readable medium storing a program that, when executed, causes a processor to excite a first electrode that is electrically isolated from a downhole tool by a first insulating sleeve, wherein the first electrode circumnavigates a first portion of the downhole tool, and wherein exciting the first electrode produces a first formation current, receive one or more induced signals from a target, wherein the one or more induced signals are associated with the first formation current, determine at least one of a distance, a direction and an orientation to the target based, at least in part, on the one or more induced signals, adjust one or more drilling parameters based, at least in part, on at least one of the distance, the direction and the orientation. In one or more embodiments, the first electrode is shrink-wrapped onto the first insulating sleeve. In one or more embodiments, the first electrode is electrically coupled to one or more electrical components of the drill string via an opening that extends from inside the drill string through the first insulating sleeve. In one or more embodiments, the first insulating sleeve is tapered at each edge. In one or more embodiments, the program of the non-transitory computer readable medium when executed further causes the processor to excite a second electrode insulated from the downhole tool by a second insulating sleeve, wherein the second electrode circumnavigates a second portion of the downhole tool, and wherein exciting the second electrode causes the second electrode to act as a return electrode for the first formation current and communicate information by at least one of the first electrode and the second electrode to an information handling system at a surface. In one or more embodiments, the first insulating sleeve and the second insulating sleeve form a single sleeve that extends from the first portion through the second portion.

The particular embodiments disclosed above are illustrative only, as the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present disclosure. Also, the terms in the claims have their plain, ordinary meaning unless otherwise explicitly and clearly defined by the patentee. The indefinite articles "a" or "an," as used in the claims, are defined herein to mean one or more than one of the element that it introduces.

What is claimed is:

1. A method for downhole ranging within a formation, the method comprising:
 exciting a first electrode that is electrically isolated from a downhole tool by a first insulating sleeve, wherein the first electrode and the first insulating sleeve circumnavigate a first portion of the downhole tool, and wherein exciting the first electrode produces a first formation current;
 exciting a second electrode that is electrically isolated from the downhole tool by a second insulating sleeve, wherein the second electrode and the second insulating sleeve circumnavigate a second portion of the downhole tool, and wherein exciting the second electrode causes the second electrode to act as a return for the first formation current;

receiving one or more induced signals from a target, wherein the one or more induced signals are associated with the first formation current;

determining at least one of a distance, a direction and an orientation to the target based, at least in part, on the one or more induced signals; and adjusting one or more drilling parameters based, at least in part, on at least one of the distance, the direction and the orientation;

and wherein both of the first insulating sleeve and the second insulating sleeve are tapered at each edge, wherein each tapered edge is configured to minimize friction experienced by at least one of the first insulating sleeve and the second insulating sleeve, wherein each edge of the first insulating sleeve begins to taper at a point where the first insulating sleeve meets an end of the first electrode, wherein each edge of the second insulating sleeve begins to taper at a point where the second insulating sleeve meets an end of the second electrode.

2. The method of claim 1, wherein at least one of the first electrode is shrink-wrapped onto the first insulating sleeve and the second electrode is shrink-wrapped onto the second insulating sleeve.

3. The method of claim 1, wherein at least one of the first electrode and the second electrode is excited by the downhole tool.

4. The method of claim 1, further comprising:
communicating information between at least one of the first electrode and second electrode and an information handling system at a surface.

5. The method of claim 1, wherein the one or more induced signals are received at one or more receivers of the downhole tool, and wherein the one or more receivers measure an induced magnetic field on the target.

6. The method claim 1, wherein both the first insulating sleeve and the second insulating sleeve extend beyond the first electrode and the second electrode, respectively.

7. A wellbore drilling system for drilling in a subsurface earth formation, comprising:
a drill string;
a first insulating sleeve coupled to the drill string;
a first electrode coupled to the first insulating sleeve, wherein the first electrode circumnavigates the drill string, and wherein the first insulating sleeve electrically isolates the first electrode from the drill string; and
an information handling system communicably coupled to the drill string, the information handling system comprises a processor and memory device coupled to the processor, the memory device containing a set of instruction that, when executed by the processor, cause the processor to:
excite the first electrode that is electrically isolated from the drill string by the first insulating sleeve, wherein the first electrode circumnavigates a first portion of the drill string, and wherein exciting the first electrode produces a first formation current;
excite a second electrode insulated from the drill string by a second insulating sleeve, wherein the second electrode circumnavigates a second portion of the drill string, and wherein exciting the second electrode causes the second electrode to act as a return for the first formation current;

receive one or more induced signals from a target, wherein the one or more induced signals are associated with the first formation current;
determine at least one of a distance, a direction and an orientation to the target based, at least in part, on the one or more induced signals; and
adjust one or more drilling parameters based, at least in part, on at least one of the distance, the direction and the orientation;
and wherein both of the first insulating sleeve and the second insulating sleeve are tapered at each edge, wherein each tapered edge is configured to minimize friction experienced by at least one of the first insulating sleeve and the second insulating sleeve, wherein each edge of the first insulating sleeve begins to taper at a point where the first insulating sleeve meets an end of the first electrode, wherein each edge of the second insulating sleeve begins to taper at a point where the second insulating sleeve meets an end of the second electrode.

8. The wellbore drilling system of claim 7, wherein at least one of the first electrode is shrink-wrapped onto the first insulating sleeve and the second electrode is shrink-wrapped onto the second insulating sleeve.

9. The wellbore drilling system of claim 7, wherein at least one of the first electrode and the second electrode is excited by the downhole tool.

10. The wellbore drilling system of claim 7, wherein the set of instructions further cause the processor to:
communicate information between at least one of the first electrode and the second electrode and the information handling system at a surface.

11. The wellbore drilling system of claim 10, wherein both the first insulating sleeve and the second insulating sleeve extend beyond the first electrode and the second electrode, respectively.

12. The wellbore drilling system of claim 7, further comprising:
one or more receivers of the downhole tool that receive the one or more induced signals, wherein the one or more receivers measure an induced magnetic field on the target.

13. A non-transitory computer readable medium storing a program that, when executed, causes a processor to:
excite a first electrode that is electrically isolated from a downhole tool by a first insulating sleeve, wherein the first electrode circumnavigates a first portion of the downhole tool, and wherein exciting the first electrode produces a first formation current;
excite a second electrode insulated from the downhole tool by a second insulating sleeve, wherein the second electrode circumnavigates a second portion of the downhole tool, and wherein exciting the second electrode causes the second electrode to act as a return electrode for the first formation current;
receive one or more induced signals from a target, wherein the one or more induced signals are associated with the first formation current;
determine at least one of a distance, a direction and an orientation to the target based, at least in part, on the one or more induced signals; and
adjust one or more drilling parameters based, at least in part, on at least one of the distance, the direction and the orientation;
and wherein both of the first insulating sleeve and the second insulating sleeve are tapered at each edge, wherein each tapered edge is configured to minimize friction experienced by at least one of the first insulating sleeve and the second insulating sleeve, wherein each edge of the first insulating sleeve begins to taper at a point where the first insulating sleeve meets an end of the first electrode, wherein each edge of the second insulating sleeve begins to taper at a point where the second insulating sleeve meets an end of the second electrode.

14. The non-transitory computer readable medium of claim 13, wherein at least one of the first electrode is shrink-wrapped onto the first insulating sleeve and the second electrode is shrink-wrapped onto the second insulating sleeve.

15. The non-transitory computer readable medium of claim 13, wherein at least one of the first electrode and the second electrode is excited by the downhole tool.

16. The non-transitory computer readable medium of the claim 13, wherein the program, when executed, causes the processor to:
communicate information by at least one of the first electrode and the second electrode to an information handling system at a surface.

17. The non-transitory computer readable medium of claim 13, wherein both the first insulating sleeve and the second insulating sleeve extend beyond the first electrode and the second electrode, respectively.

* * * * *